Feb. 12, 1957    E. C. CREUTZ ET AL    2,781,308
NEUTRONIC REACTOR CONTROL
Filed April 12, 1945    4 Sheets-Sheet 1

Feb. 12, 1957 E. C. CREUTZ ET AL 2,781,308
NEUTRONIC REACTOR CONTROL
Filed April 12, 1945 4 Sheets-Sheet 3
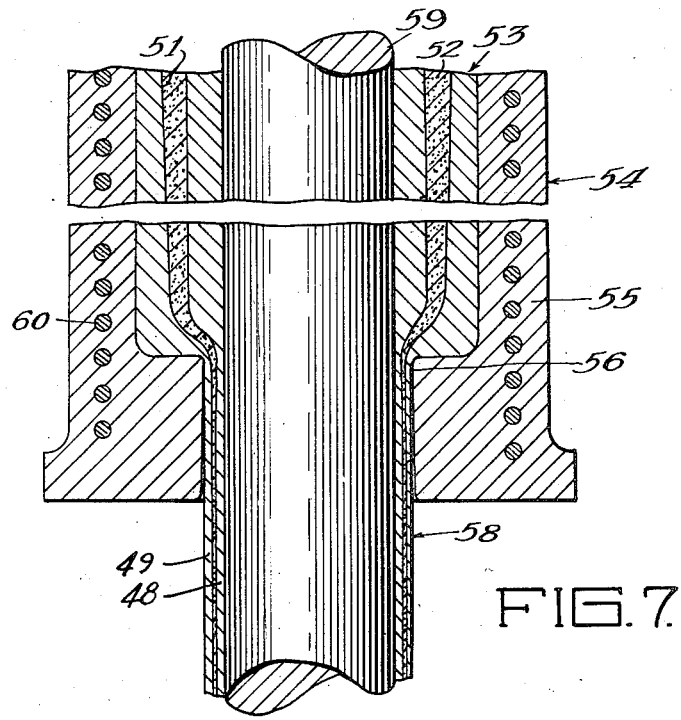
FIG. 7.
FIG. 6.
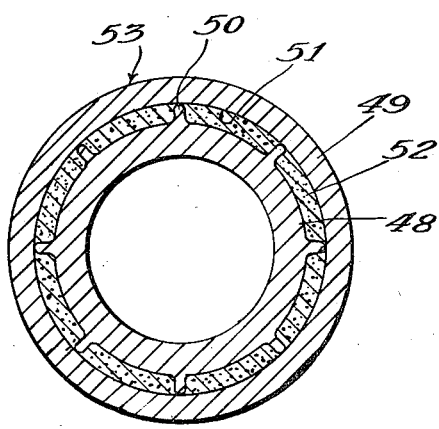
Witnesses:
Herbert E. Metcalf
Albert F. Bower
Inventors:
Edward C. Creutz
Walter H. Zinn
By Robert A. Lavender
Attorney

2,781,308

NEUTRONIC REACTOR CONTROL

Edward C. Creutz, Santa Fe, N. Mex., and Walter H. Zinn, Chicago, Ill., assignors to the United States of America as represented by the United States Atomic Energy Commission Application April 12, 1945, Serial No. 588,061

2 Claims. (Cl. 204—193)

Our invention relates to safety and control devices for neutronic reactors and more particularly to methods of fabricating members incorporating materials highly absorbent to neutrons for use in such reactors. In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in Fermi et al. Patent 2,708,656, dated May 17, 1955.

In such a reactor the rate of reaction is controlled by introduction into the reactor or into an area closely adjacent to the reactor of a high neutron absorber such as boron, cadmium, or other material having a high danger coefficient as hereinafter defined. The present invention is particularly concerned with a new control means frequently known as a control rod. Such a control means commonly known as a control rod comprises a high neutron absorber and a solid low neutron absorbing shield or barrier capable of preventing contamination of the reactor components by the high absorber interposed between the high absorber and another element of the reactor, particularly the moderator. Advantageously the control and its shield may be integral and may comprise a high neutron absorber supported and/or enclosed or sheathed with a low neutron absorber.

The neutron absorption characteristics of the high and low absorber may be expressed conveniently in terms of certain constants known as "danger coefficients." The danger coefficients are defined in terms of the ratio of the weight of the element for unit mass of uranium and are based on the cross section for absorption of thermal neutrons of the various elements. These values may be obtained from published literature on the subject, such as Physicalische Zeitschrift, vol. 43, p. 440 and Zeitschrift für Physik, vol. 121, p. 201 (published in 1942 and 1943, respectively), and the danger coefficient computed by the formula $$\frac{\sigma_i}{\sigma_u} \cdot \frac{A_u}{A_i}$$

wherein $\sigma_i$ represents the cross section for the element and $\sigma_u$ represents the cross section of the uranium, $A_i$ the atomic weight of the element and $A_u$ the atomic weight for uranium. A list of the danger coefficients of various elements appears in the above mentioned Fermi et al. patent, and reference is made thereto. Certain elements such as boron, cadmium, samarium, gadolinium and some others have high danger coefficients so that even in small concentrations they have the property of capturing neutrons to a very great degree. This large absorbing cross section of some elements renders a self-sustaining chain reacting system capable of control since upon introduction of neutron absorbing material in the form of tubes into the interior of the system may be changed in accordance with the amount of absorbing material exposed to the neutrons in the system. The term "high neutron absorber" as used herein is intended to include elements in elemental or combined form which have a danger coefficient above about 100. The term "low neutron absorber" is intended to include elements in elemental or combined form which have a danger coefficient not substantially above 10.

The rod may be constructed in a variety of shapes or forms. Generally, the control element is of elongated structure usually in the form of a rod, tube, sheet or slab. The shield may be an integral part of the neutron absorbing control or the shield and high neutron absorber may comprise separate individual structures. An especially effective structure may be secured when the high and low neutron absorbers are integral, the low absorber forming a sheath for the high absorber. One effective construction of this type comprises three concentric tubes, the intermediate tube being a high neutron absorber and the others being low neutron absorbers. If desired a base tube of low neutron absorbing material such as steel or aluminum may be wrapped with a foil or may be plated with a coating of a high neutron absorber such as cadmium.

In order to obtain an effective control of the reaction the control members which regulate the neutron reproduction ratio of the self-sustaining chain reaction should furnish easy, quick, and uniform regulation. It is desirable that the neutron absorbing material be distributed throughout an extended area within the reactor and that the neutron absorbing material have throughout this area a fairly uniform area for neutron absorption. In addition the control member preferably should give a sensitive control by distributing a low concentration of neutron absorbing material along the length of an elongated control member. Thus each unit length of the control member may absorb comparatively small numbers of neutrons yet the entire control member will absorb enough neutrons to drop the reproduction ratio below unity. In this way a control is provided that can both effect small variations in the reproduction ratio and also stop the chain reaction entirely. As the more desirable neutron absorbing substances are not structurally strong enough to be formed into an elongated member it is preferable that the absorbing material be more or less integrally united with and supported by a structurally strong and rigid material to form a unitary member of the desired shape and dimensions for introducing the absorbing material into the neutronic reactor.

The positioning of the control member is a very sensitive operation and the member must respond readily to the mechanical forces effective to insert or withdraw the control member. Thus when it is desired to increase or decrease neutron density within a neutronic reactor the rate of change obtained can be readily determined over a fine range of gradations. In this way a sensitive control is obtained. The material for containing the neutron absorbing substance in the shape of an elongated control member preferably has a light mass so that the low inertia will allow the control member to respond readily to manipulation. The sheathing or supporting material is also preferably non-reacting with the substances in the neutronic reactor particularly the moderator and easily fabricated into an elongated member and of uniform dimensions so that it presents a minimum of variation in physical characteristics on being moved through a field of neutrons in a neutronic reactor.

In the manufacture of a member which will serve the purpose of absorbing neutrons and controlling the reproduction ratio in a neutronic reactor it is generally found advantageous to construct the rod so that the neutron absorbing substance is distributed in a uniform quantity throughout the length of the control member. The operation of preparing such a control member has presented many difficulties because of the problem of attaining a uniform thickness both of the supporting or sheathing material and the neutron absorbing substance and at the same time obtaining the proper thickness in the neutron absorbing layer.

In accordance with a modification of this invention a suitable control member may be provided by extruding or drawing a tube comprising a neutron absorbing material included between concentric tubes.

We have found that when a rod or tube composed of concentric layers is extruded the relation between the layers is rearranged as the inner layers are extruded first in relation to the outer layers with the result that in the head of the extruded product the inner layers have a thickness which tapers to a thinness at the butt end. Conversely, the outer layers are extruded subsequent to the inner layers and are thin at the head end of the extruded product widening to a thickness at the butt end.

Thus it is an object of this invention to provide a new type of control rod adapted for use in a neutronic reactor, particularly a liquid moderated neutronic reactor.

The above object and other objects, features and advantages of the invention will be apparent from the following detailed description of several preferred embodiments when taken with the accompanying drawings in which:

Fig. 6 is a plan view in cross section of a double walled tube with boron carbide powder packed between the walls before extruding;

Fig. 7 is a side view partly in section of an extrusion press and mandrel for extruding the double walled tube shown in Fig. 6;

The self-sustaining chain reacting system of nuclear fission takes place in a neutronic reactor which is composed of masses of uranium placed in a slowing medium with the proper geometry to produce a reproduction ratio of neutrons which will provide the self-sustaining chain reaction of nuclear fission. Control of the fissioning and the rate of reproduction is gained by absorbing members which may increase or decrease the reproduction ratio.

Figure 1:
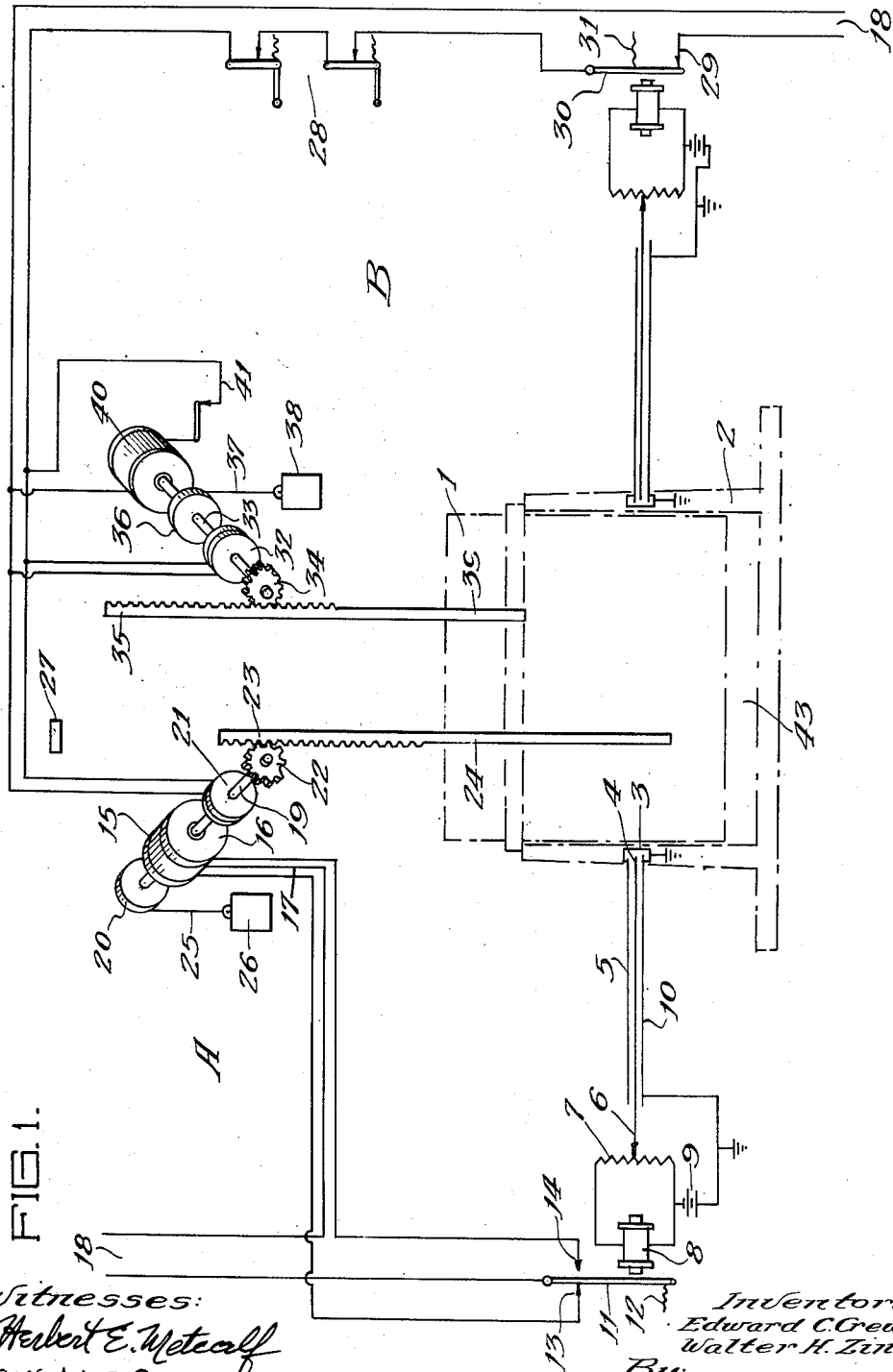
Fig. 1 is a diagrammatic representation of a neutronic reactor system and one form of control circuit for regulating the system.

Fig. 1 shows diagrammatically one form of control circuit for regulating the ratio of reproduction in a self-sustaining chain reaction system. A neutronic reactor 1 capable of a self-sustaining chain reaction is surrounded with a reflecting structure 2. However this circuit is purely illustrative and the present invention is not confined to use with any specific circuit particularly since the control rod herein contemplated may be used manually. Referring first to control circuit A, a control ionization chamber 3 is placed within the structure 2 adjacent to the periphery of the reactor 1 and the ionization chamber 3 is filled with boron fluoride. A central electrode 4 is provided within the chamber 3 and connected to wire 5 leading outside of the reactor to movable contact 6 on a resistor 7. The resistor 7 is connected across a relay coil 8. One side of relay coil 8 is attached to battery 9 the other end of which is connected to shield 10 around the wire 5. Shield 10 is grounded as is chamber 3. Alpha ray ionization due to neutron reaction with the boron fluoride within chamber 3 is proportional to the neutron density. Thus the current in resistor 7 is varied in accordance with the neutron density reaching ionization chamber 3. Relay coil 8 operates a relay armature 11 which is spring biased by spring 12 to contact one motor contact 13 and is urged by current in coil 8 to contact a second motor contact 14. Contacts 13 and 14 connect to the outside of split winding 15 of motor 16, the center connection 17 of which is connected through power mains 18 to armature 11. Motor 16 operates shaft 19 having on one end thereof a pulley 20, the other end thereof being connected through a magnetic clutch 21 to a control rod gear 22. The gear 22 meshes with a rack 23 on a control rod 24. Pulley 20 has a cable 25 wound thereon connected to a counterweight 26 so that the weight of the control rod 24 is substantially balanced by counterweight 26 thus permitting motor 16 to run easily in either direction.

Having described a circuit for controlling the position of a control rod, we will now describe its operation, considering the safety rods withdrawn. Contact slider 6 on resistor 7, having previously been calibrated in terms of neutron density, is moved to the density position at which it is desired the reactor operate, taking into account the difference in the neutron density at the center of the lattice and the periphery thereof during the operation. The reactor having at rest a neutron density much lower than the desired density at which coil 8 will receive enough current to operate armature 11, very little ionization takes place in ionization chamber 3 thus causing armature 11 to rest against the contact 13. Motor 16 is thus energized to withdraw the control rod 24 from the reactor to a point determined by a limit stop 27 where the reproduction ratio of the reactor is sufficiently greater than unity to permit an exponential rise in neutron density within the reactor.

The motor 16 will stall when the rod is at stop 27 and should be of a type permitting stalling for the required time. The reaction at this position of the control rod becomes self-sustaining and the neutron density rises. In consequence the ionization within chamber 3 rises. As the ionization in chamber 3 increases, more and more current passes through relay coil 8 until the desired value has been reached. Relay coil 8 then operates to cause armature 11 to connect with contact 14 thus reversing the motor 16 to drive the control rod 24 into the reactor to a point where the neutron density starts to decay. The control rod 24 will thereafter hunt between a point above the balance position where the neutron density rises, and a point below the balance position where the neutron density decays, thus providing an average neutron density within the reactor as determined by the setting of slider 6 on resistor 7. As the mass of the reactor causes any temperature change to lag behind any neutron density change, the temperature of the reactor is maintained substantially constant. If desired, any of the well-known anti-hunting circuits may be utilized, as will be apparent to those skilled in the art.

The main purpose of the control circuit A is to regulate the control rod to substantially balance the neutron density to maintain any desired average temperature within the reactor.

Due to the fact that it might be possible for the control system as described to fail, and thereby leave the control rod in a position where the neutron density would continue to rise indefinitely, both the safety rods 39 and the control rod 24 are preferably to be operated so as to enter the pile immediately upon any failure of the control rod system. One such emergency circuit that illustrates the operation of the safety rods is illustrated in circuit B. The circuit for each of the safety rods is the same.

Circuit B comprises a connection to the same power mains 18 mentioned above in connection with circuit A. One side of the mains passes through a plurality of hand operated emergency switches 28, and a contact 29 held in connection with a relay armature 30 by a spring 31, all switch connections being normally closed. Both legs of mains 18 then are connected to energize magnetic clutch 21 on the control rod shaft 19 and also a similar magnetic clutch 32 on a safety rod shaft 33.

Safety rod shaft 33, on one side of magnetic clutch 32, ends in a safety rod gear 34 meshing with safety rod rack 35. On the other side of clutch 32 a safety rod pulley 36 has a cable 37 wound thereon connecting with a safety rod counterweight 38. Thus the safety rod 39, with clutch energized, will stay in any position it is placed.

Safety rod 39 is normally moved in and out of the pile by safety rod motor 40 by connection to mains 18 through hand switch 41.

Relay armature 30 is controlled by an ionization chamber circuit identical in all respects with the circuit previously described for operating the control rod. The circuit may be adjusted, for example, to attract relay armature 30 and open the circuit when the neutron density reaches 5 percent over the normal operating density. Hand-switches 28 can be used for the same purpose by the operating personnel.

Safety rod magnetic clutch 32 is connected in parallel with control rod magnetic clutch 21. Thus, upon any failure of power in the mains or the opening of the switches 28, all of the rods will be relieved of their counterweights and will fall into the pile by gravity. Stops may be provided on the rods, and any suitable braking action used to reduce the impact shock on the reactor.

Irrespective of how the circuit is opened, magnetic clutches 21 and 32 disengage, and remove the influence of the counterweights from the rods. The rods then drop into the system by gravity, stopping the reaction.

Cadmium and boron are preferred for use in control members in a neutronic reactor because of their high danger coefficients. Samarium and gadolinium also have high danger coefficients and would be desirable for controlling the chain reaction but these elements are not available at the present time in sufficient quantities to be used in a control member. Boron and cadmium have danger coefficients that give a small quantity of the boron or cadmium sufficient neutron absorbing ability to attain the desired control of the chain reaction. To attain a sensitive and uniform control throughout the neutronic reactor, as stated above, this small amount of boron or cadmium may be distributed more or less uniformly in an elongated structure through the neutronic reactor. As a result the boron or the cadmium in the control members is stretched to a thinness which deprives it of structural strength. Therefore it is preferable that a control member employing boron or boron carbide or cadmium as a neutron absorbing substance comprise a container in which the neutron absorbing substance is placed, the container being composed of a material that will provide a structural strength to a control member.

In the embodiment of our invention shown in Figs. 2 to 5 a double walled aluminum tube is formed containing a thin strip of cadmium between the two walls.

Figure 2:
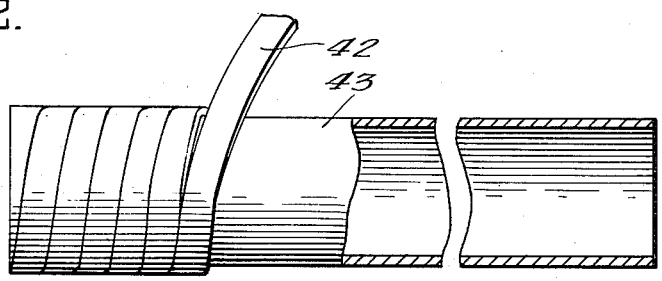
Fig. 2 is a side view in elevation, partly in section, of a thin walled tube partly wrapped with a layer of cadmium foil.
Figure 3:
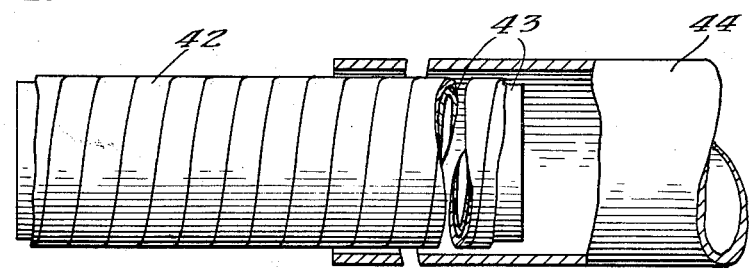
Fig. 3 is a side view in elevation of the cadmium wrapped tube shown in Fig. 2 partly inserted into an outer tube that is shown partly in section.
Figure 4:
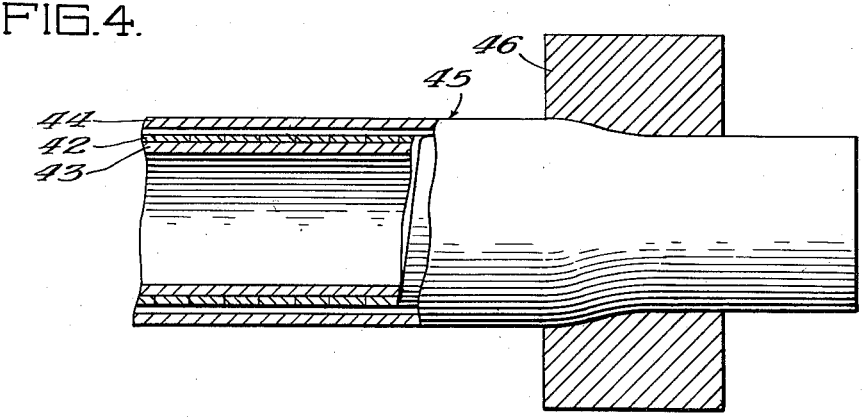
Fig. 4 is a side view in elevation of the assembly of the outer tube and the cadmium wrapped inner tube partly in section, being drawn through a die.
Figure 5:
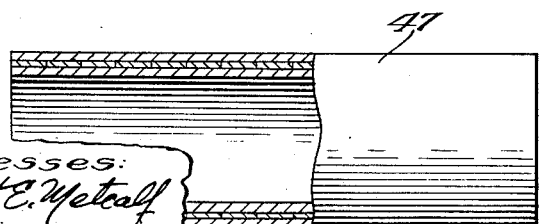
Fig. 5 is a side view in elevation of the drawn double walled tube with an interposed layer of cadmium foil.

In Fig. 2 a thin cadmium tape 42 is shown partially wrapped in a tight helix around a thin walled aluminum tube 43 which is the first step in forming the finished tube 47 shown in Fig. 5 which tube may be inserted in the neutronic reactor 1 of Fig. 1 as either the control member 24 or the safety rod 39. The cadmium wrapping 42 is securely fastened to the tube 43 by any suitable means. To provide a covering over the cadmium wrapping 42, the cadmium wrapped inner tube 43 is fitted into another thin walled aluminum tube 44 of a sufficient inner diameter to permit a slight clearance as shown in Fig. 3. The assembly 45 of the cadmium wrapped inner tube 43 and the outer tube 44 is drawn through a die 46 as shown in Fig. 4. The drawing operation elongates and reduces the diameter of the outer tube 44 so that it is pressed against the cadmium wrapping 42 on the inner tube 43. This compression of the outer tube 44 against the inner tube 43 clinches the outer tube 44 onto the inner tube 43 and thus binds the two together. At the same time the inner tube 43 and the wrapping 42 on the inner tube are also reduced in diameter, elongated and thinned in thickness. The product of the drawing operation is shown in Fig. 5 as a laminated tube 47 comprising the cadmium wrapping tightly bound between the two aluminum walls which provide structural rigidity to the rod and protect the reactor from contamination of the neutron absorber.

The tube 47 may be formed in a range of lengths with various dimensions for the diameter and wall thickness of the component parts depending upon the size and geometry of the neutronic reactor in which the particular control member is to be used. One example of satisfactory dimensions is a tube with a diameter of 3 inches and an overall wall thickness of approximately a quarter of an inch which is made up of two aluminum walls each an eighth of an inch in thickness containing a cadmium layer of between two and three hundredths of an inch in thickness.

In another embodiment of our invention shown in Figs. 6 to 9 the neutron absorbing material may be of a pulverulent form such as a pulverulent carbide of boron. Referring to Fig. 6 a thin walled aluminum tube 48 is shown placed inside a larger thin walled aluminum tube 49. The tube 48 is spaced away from and centered in tube 49 by axial fins 50 raised on the outside surface of the tube 48. The axial fins 50 form spaces 51 between the inner surface of the outer tube 49 and the outer surface of the inner tube 48. Into these spaces 51 which run axially between the tubes 48 and 49 is packed a boron carbide powder 52 to fill the spaces 51. Thus is assembled a composite tube 53 comprised of two walls containing between them neutron absorbing boron carbide by hot extrusion. The composite tube 53 may be consolidated into a smaller tube 58 with thinner walls clinched together and a more tightly packed absorbing material shown in cross section in Fig. 9.

In a preferred embodiment of extrusion apparatus according to my invention as shown in Fig. 7 an extrusion press 54 comprises a die block 55 with die lands 56 through which the composite tube 53 may be extruded into a narrower and elongated tube 58 with thinner walls. A mandrel 59 is provided to project through the die block 55 and the interior of the tube 53 during extrusion and thus determined the inner diameter of the extruded tube 58. Either the composite tube 53 or the extruded tube 58 may be inserted in the neutronic reactor 1 of Fig. 1 as a control or safety member. The extrusion reduces the diameter of the composite tube 53, thins the walls 48 and 49 and the boron carbide packing 52, elongates them and squeezes the parts together into a tight fitting composite tube 58.

When a rod or tube composed of concentric layers is extruded the concentric layers do not retain in the extruded product the same relation or proportional thickness that they have in the original billet. The thicknesses of the layers upon extrusion are altered as the centermost layer precedes the others in extrusion and the next innermost layer is second in sequence and so on, the outermost layer lagging behind. As a result when a tube composed of three concentric layers is extruded through a die the innermost layer is thicker at the head end of the extruded product than in the original billet and tapers to a narrower width at the butt end of the extruded product than in the original billet. The outermost layer on the other hand is thinner at the head end of the extruded product than in the original billet and widens to a greater thickness in the butt end of the extruded product than in the original billet.

To avoid this inequality upon extruding the composite tube 53 and to obtain a uniform thickness in the walls and absorbing material of the tube 58, the outer tube 49 in the composite tube 53 is prepared as shown in Fig. 7 with a taper from a thick portion at the head end to a thin portion at the butt end. Thus when the billet 53 is extruded the tendency of the inner tube 48 to be extruded first is compensated for by the relatively thicker dimension of the outer tube 49 at the head end and as the extrusion progresses the tendency of the outer tube 49 to become relatively thicker in dimension is compensated for by the taper in wall thickness to relative thinness at the butt end of the composite tube 53. The taper of the wall thickness of the tube 49 shown in Fig. 7 is obtained by inclination of the inner surface of the tube toward the outer surface of the tube as the butt end is approached. This compensating taper offsets the wedging action between the concentric tubes 48 and 49 and the boron carbide layer 52 and provides a boron carbide layer 52 of uniform thickness and at the same time walls of uniform thickness throughout the length of the tube 58.

When aluminum tubes are used it is preferred that the extrusion be carried on at temperatures in excess of 300° C. and preferably around 325° C. The composite tube 53 may be heated by any suitable means and the die block 55 may be heated by resistance winding 60 to maintain the extrusion at the preferred temperature.

Figure 8:
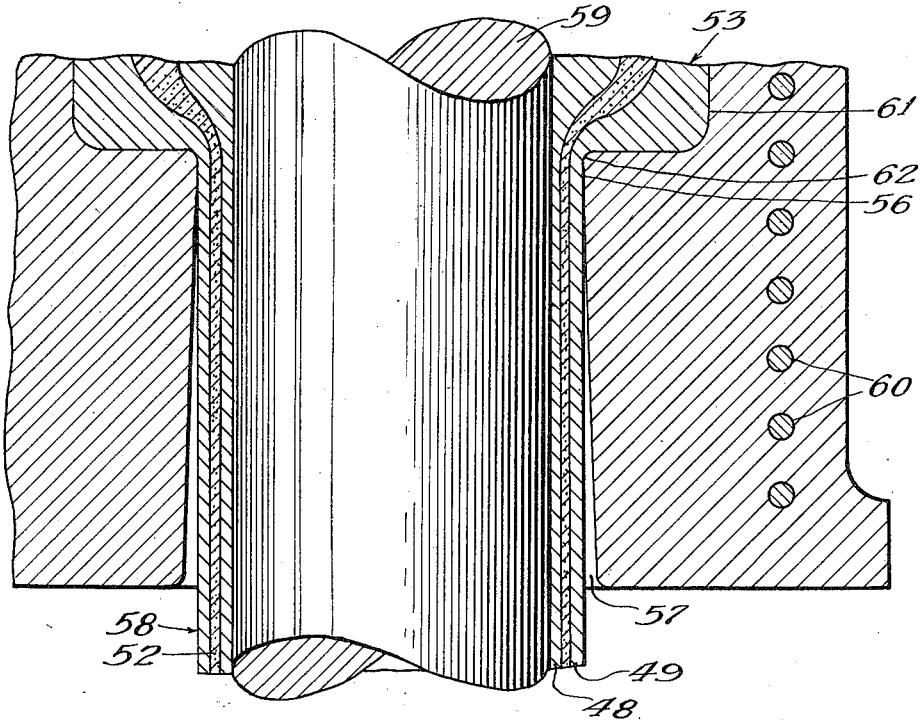
Fig. 8 is an enlarged view partly in section, of the die used in an extrusion press.
Figure 9:
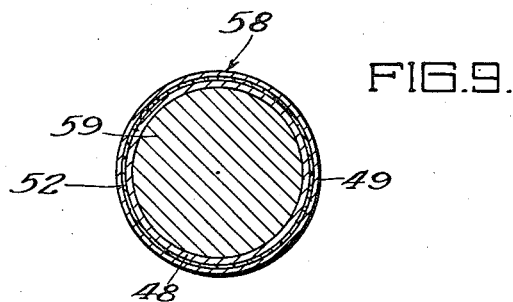
Fig. 9 is a top view in cross section of the extruded double walled tube.

A central chamber 61 in the die block 55 terminates at the die land 56 which enter onto the channel 57. Fig. 8 in an enlarged view of the die shows that the land 56 forms a straight portion of the channel 57 which is parallel to the excess of the mandrel 59 and the wall of the formed tube 58. A rounded shoulder 62 edges the land 56 on the side of the chamber 61 and starting at the edge of the land 56 opposite from the shoulder 62 the walls of the channel 57 taper away from the center at a five degree angle. This recession of the walls of channel 57 prevents the adhesion of the softened tube to the channel walls. The walls and the boron carbide of the tube 58 produced by the extrusion are thinned as shown in Fig. 9 and the fins 50 are reduced by the elongation concomitant with the extrusion. The boron carbide 52 is tightly packed in a uniformly distributed neutron absorbing layer between two uniform low danger coefficient walls of aluminum, the extrusion of the tube 53 into the tube 58 reducing the thickness of the boron carbide 52 to the proper dimension for obtaining the desired degree of control of the reproduction ratio in a chain reaction by use of the tube 58 as a control member.

In one example of the method of fabrication of a control rod by this method shown in Figs. 6 to 9 the tube 48 has an inner diameter of 2.8 inches and an outer diameter of 3.6 inches and the tube 49 has inner diameter of 4.2 inches at the butt end and 4.0 inches at the head end and a uniform outer diameter of 5.1 inches. The 8 equally spaced fins 50 having a height which tapers from 2.3 inches at the butt end of the tube 48 to 1.5 inches at the head end to match the taper on the inner wall of the tube 49. The fins 50 are one-eighth of an inch in width and a circumferential spacing between them of 1.5 inches. The finished tube 58 has an outer diameter of approximately three inches and an inner diameter of approximately two and a half inches and each wall having a thickness of an eighth of an inch and the boron carbide layer being approximately 1 mm. (.04").

The neutron bombardment of neutron absorbing boron causes a nuclear disintegration of the boron nucleus into lithium and helium following the equation:

$$_5B^{10} + _0n^1 \rightarrow _5B^{11} \rightarrow _3Li^7 + _2He^4 \uparrow$$

The use of boron as an absorbing material thus results in the evolution of helium which is in a gaseous state. In order to avoid difficulty due to this phenomenon one end of the spacer 51 is sealed by any suitable means and the other is left open to permit the escape of the helium evolved during neutron absorption by the boron. In such a case the open end should not be introduced into the reactor.

Although a specific example of the dimension of tube 58 has been described the length and other dimensions of a control or safety member employing a boron carbide as a neutron absorber are variable and determined by the type and length of use and the neutron density to which the member is subjected.

It will be understood that either the tube 47 or the tube 58 may be used as the control rod 24 or the safety rod 39, both shown in Fig. 1, and so will have associated with its upper end a rack like the rack 23 or the rack 35, by which it is moved longitudinally into and from the active portion of the reactor.

A control rod such as herein described is capable of use in neutronic reactors generally. It is particularly adapted to use with reactors which are liquid moderated, such as a reactor comprising a pool of deuterium oxide with uranium rods immersed therein. With such reactors, control of the neutronic reaction may be effected by immersing the control rod into the pool of liquid moderator and controlling the rate of reaction by controlling the portion of the control rod so immersed. Thus this novel control may be used in the liquid moderated reactor described in the above mentioned Fermi-Szilard application. The external sheath prevents possible contamination of the moderator by the neutron absorber and thus the control and moderator may be used for substantial periods without repurification.

Moreover, other means for accomplishing the invention may be provided. For example, a well of low neutron absorbing material may extend into the neutron reactor and a rod of high neutron absorbing material may be moved in and out of the well to effect control of the reaction.

It should be noted that the chain reaction system described above is merely exemplary and not limiting insofar as our invention is concerned since it will be apparent that other similar systems will be suggested to those skilled in the art. Numerous variations and modifications in the preferred embodiments, methods and examples described will be readily apparent and may be made without departing from the spirit and scope of our invention as defined in the following claims.

We claim:

1. In combination with a neutronic reactor active portion comprising a mass of a material containing a thermal neutron fissionable isotope and a neutron slowing material, constructed and arranged to undergo a self-sustaining chain reaction, the improvement comprising a tubular member serving as a control rod or as a safety rod and consisting essentially of a material having a danger coefficient of at least 100 enclosed in inner and outer protective tubes of a material having a danger coefficient less than 10, and means to selectively insert and withdraw said member longitudinally into and from the active portion.

2. In combination with a neutronic reactor active portion comprising a mass of a material containing a thermal neutron fissionable isotope and a neutron slowing material, constructed and arranged to undergo a self-sustaining chain reaction, the improvement comprising a tubular member serving as a control rod or a safety rod consisting essentially of a cadmium layer of between 2 and 3 one-hundredths of an inch thickness enclosed in inner and outer protective tubes of aluminum, each of approximately an eighth of an inch thickness, and means to selectively insert and withdraw said member longitudinally into and from the active portion.

References Cited in the file of this patent

UNITED STATES PATENTS

| | | |
|---|---|---|
| 440,952 | Land | Nov. 18, 1890 |
| 697,575 | Wall | Apr. 15, 1902 |
| 831,887 | Nicholson | Sept 25, 1906 |
| 1,383,175 | Udy et al. | June 28, 1921 |
| 1,383,176 | Udy et al. | June 28, 1921 |
| 1,594,061 | Jones | July 27, 1926 |
| 2,198,149 | Bangert | Apr. 23, 1940 |
| 2,303,869 | Quinlan et al. | Dec. 1, 1942 |
| 2,366,168 | Bakarian | Jan. 2, 1945 |
| 2,372,607 | Schwarzkopf | Mar. 27, 1945 |

FOREIGN PATENTS

| | | |
|---|---|---|
| 114,150 | Australia | May, 2, 1940 |
| 114,151 | Australia | May 3, 1940 |
| 861,390 | France | Feb. 7, 1941 |
| 233,011 | Switzerland | Oct. 2, 1944 |

OTHER REFERENCES

Smyth: "Atomic Energy for Military Purposes," pp. 103, 104, August 1945.

Kelly et al.: Phy. Rev. 73, 1135–9 (1948).